(12) United States Patent
Nentwig

(10) Patent No.: US 8,750,803 B2
(45) Date of Patent: Jun. 10, 2014

(54) INTERFERENCE CANCELLATION FOR PREDICTIVE SIGNALS

(75) Inventor: Markus Nentwig, Helsinki (FI)

(73) Assignee: Nokia Corporation, Espoo (FI)

( * ) Notice: Subject to any disclaimer, the term of this patent is extended or adjusted under 35 U.S.C. 154(b) by 769 days.

(21) Appl. No.: 12/486,291

(22) Filed: Jun. 17, 2009

(65) Prior Publication Data

US 2010/0323622 A1 Dec. 23, 2010

(51) Int. Cl.
*H04B 1/00* (2006.01)

(52) U.S. Cl.
USPC .......... 455/63.1; 455/246; 455/303; 455/306; 455/63.3; 455/62; 375/270; 375/301; 370/203; 370/328

(58) Field of Classification Search
USPC ........... 455/41, 63.1, 296, 303, 306, 71, 63.3, 455/62, 67.13, 67.11, 246, 226.1, 562, 455/552.1; 375/260, 270, 301, 321, 227, 375/229, 230, 144, 148, 167, 346; 370/203, 370/208, 329, 330, 335, 400, 328
See application file for complete search history.

(56) References Cited

U.S. PATENT DOCUMENTS

| | | | | |
|---|---|---|---|---|
| 4,812,851 | A * | 3/1989 | Giubardo | 342/389 |
| 6,049,577 | A * | 4/2000 | Gothe et al. | 375/368 |
| 6,603,734 | B1 | 8/2003 | Oksanen | |
| 7,346,041 | B2 | 3/2008 | Eklund et al. | |
| 7,903,770 | B2 * | 3/2011 | Levin et al. | 375/346 |
| 8,630,602 | B2 * | 1/2014 | Attar et al. | 455/296 |
| 2002/0093988 | A1 * | 7/2002 | Minowa et al. | 370/509 |
| 2007/0160159 | A1 * | 7/2007 | Song et al. | 375/260 |
| 2007/0202901 | A1 * | 8/2007 | Hulbert | 455/501 |
| 2007/0211680 | A1 * | 9/2007 | Laroia et al. | 370/338 |
| 2007/0217531 | A1 * | 9/2007 | Kwon et al. | 375/260 |
| 2007/0237249 | A1 * | 10/2007 | Isson et al. | 375/260 |
| 2007/0242765 | A1 * | 10/2007 | Parizhisky et al. | 375/260 |
| 2007/0247365 | A1 * | 10/2007 | Laroia et al. | 342/385 |
| 2007/0291714 | A1 * | 12/2007 | Laroia et al. | 370/338 |
| 2008/0043888 | A1 | 2/2008 | Bhukania et al. | |
| 2008/0261613 | A1 * | 10/2008 | Anderson et al. | 455/456.1 |
| 2009/0017759 | A1 | 1/2009 | Li et al. | |
| 2009/0059841 | A1 * | 3/2009 | Laroia et al. | 370/328 |
| 2009/0122783 | A1 * | 5/2009 | Tanaka et al. | 370/350 |
| 2009/0141841 | A1 * | 6/2009 | Dateki | 375/346 |
| 2009/0225810 | A1 * | 9/2009 | Sugaya | 375/132 |
| 2010/0061398 | A1 * | 3/2010 | Stadelmeier et al. | 370/465 |
| 2010/0290545 | A1 * | 11/2010 | Kim et al. | 375/260 |
| 2010/0310016 | A1 * | 12/2010 | Okehie et al. | 375/340 |

(Continued)

OTHER PUBLICATIONS

J. Proakis; Optimum Receivers for the Additive White Gaussian Noise Channel; Digital Communications, 4th Ed., 2001, 1995, 1989, 1983; pp. 231-242.

*Primary Examiner* — Temesgh Ghebretinsae
*Assistant Examiner* — Md Talukder
(74) *Attorney, Agent, or Firm* — Locke Lord LLP

(57) ABSTRACT

A method, apparatus, system, and computer program product example embodiments of the invention are disclosed to reduce interference of predictive signal transmissions between wireless devices. In an example embodiment, a wireless receiver is configured to receive a composite signal, wherein the composite signal includes at least a beacon component comprising a regular beacon symbol. The wireless receiver is configured to determine from the beacon component, a predicted reception of a predicted future beacon symbol, using a known beacon transmission pattern. The wireless receiver is configured to cancel from the composite signal a future received beacon symbol, based at least partly on the predicted future beacon symbol.

21 Claims, 17 Drawing Sheets

(56) References Cited

U.S. PATENT DOCUMENTS

2010/0323622 A1* 12/2010 Nentwig .................... 455/63.1
2011/0170492 A1* 7/2011 Taira et al. .................. 370/328
2011/0274016 A1* 11/2011 Nentwig ..................... 370/281
2012/0275449 A1* 11/2012 Sakoda ....................... 370/350
2014/0050210 A1* 2/2014 Waters et al. ............... 370/338

* cited by examiner

INTERFERENCE CANCELLATION FOR PREDICTIVE SIGNALS

FIELD

The technical field relates to wireless communications. More particularly, the technical field relates to techniques for reducing interference caused by predictive signal transmissions between wireless devices.

BACKGROUND

In future radio systems implementing flexible spectrum use, with self organizing/self optimizing features for optimized local area access, it is expected that spectrum will be shared with other radio systems. Deployment in unlicensed bands, for example the ISM bands, is very likely.

For a radio system that is scalable to achieve top performance in widely varying node densities, a node must be able to sense, whether a radio resource is in use by another node of a cooperating radio system. The effects of interference ultimately show at a receiving node, which may be overcome by having the receiver transmit beacon signals indicating its presence. For example, a wireless local area network (WLAN) optionally uses request to send (RTS) and clear to send (CTS) messages as broadcast beacons that enable both the sender and the receiver to claim the use of the wireless medium. Another approach is the transmission of a "busy tone", or "busy burst" by a node.

In a link with a balanced volume of data in both directions, the uplink transmission by an intended receiving node can serve to mark the radio resource as used for reception of the downlink data, and vice versa.

For example, consider a mobile phone streaming video or high-quality audio. It receives large volumes of downlink traffic on a high number of radio resources (i.e. bandwidth, time slots), while transmitting only negligible amounts of uplink control traffic that may fit into the smallest radio resource unit that can be allocated. Still, it needs to announce its use of the downlink radio resources to other, nearby radios, to prevent them using the same resource for transmission and causing interference. This can be done by broadcasting regular special signals on the radio resources used for reception. The transmission of the special signal like for example beacon signals on a radio resource channel by a receiving node marks it occupied to other, nearby radios.

SUMMARY

A method, apparatus, system, and computer program product example embodiments of the invention are disclosed to reduce interference of predictive signal transmissions between wireless devices. In an example embodiment, a wireless receiver is configured to receive a composite signal, wherein the composite signal includes at least a beacon component comprising a regular beacon symbol. The wireless receiver is configured to determine from the beacon component, a predicted reception of a predicted future beacon symbol, using a known beacon transmission pattern. The wireless receiver is configured to cancel from the composite signal a future received beacon symbol, based at least partly on the future beacon symbol. In example embodiments of the invention, the composite signal comprises an information signal. In example embodiments of the invention, the information signal is received from a wireless apparatus. In example embodiments of the invention, the beacon component is received from another wireless apparatus. In example embodiments of the invention, the predicted reception of a future beacon symbol comprises predicting a type of a beacon. In example embodiments of the invention, the predicted reception of a future beacon symbol comprises predicting a future time instant.

In example embodiments of the invention, wireless receiver is configured to determine a complex scaling factor, based at least partly on the composite signal and a known beacon waveform. The wireless receiver is configured to subtract the known beacon waveform, multiplied by the scaling factor, from the composite signal. In example embodiments of the invention, the subtracting occurs only when a magnitude of the complex scaling factor exceeds a threshold. In example embodiments of the invention, the threshold is obtained from a magnitude of an earlier detected beacon. In example embodiments of the invention, the determining of a complex scaling factor is based at least partly on calculating at least one sum of products between samples of the composite signal and samples of the known beacon waveform. In example embodiments of the invention, the number of samples, over which the sum is calculated, is less than the number of samples subtracted from the composite signal.

In example embodiments of the invention, a transceiver of the wireless device is configured to receive a composite signal, wherein the composite signal includes at least a beacon component comprising a regular beacon symbol. A beacon predictor of the wireless device is configured to determine from the beacon component, a predicted reception of a predicted future beacon symbol, using a known beacon transmission pattern. A correlation detector of the wireless device is configured to determine a scaling factor, based at least partly on the composite signal and a known beacon waveform. A logic circuit of the wireless device is configured to subtract or cancel the known beacon waveform, multiplied by the scaling factor, from the composite signal. The composite signal comprises an information signal. The logic circuit is further configured to subtract or cancel only when a magnitude of the complex scaling factor exceeds a threshold. The logic circuit is further configured to obtain the magnitude from an earlier detected beacon. The correlation detector is further configured to determine the complex scaling factor based at least partly on calculating at least one sum of products between samples of the composite signal and samples of the known beacon waveform. The number of samples, over which the sum is calculated, may be less than the number of samples subtracted from the composite signal.

DESCRIPTION OF THE FIGURES

FIG. 9 illustrates an example flowchart of an embodiment for beacon detection in beacon detector 401a.

DISCUSSION OF EXAMPLE EMBODIMENTS OF THE INVENTION

Figure 1:
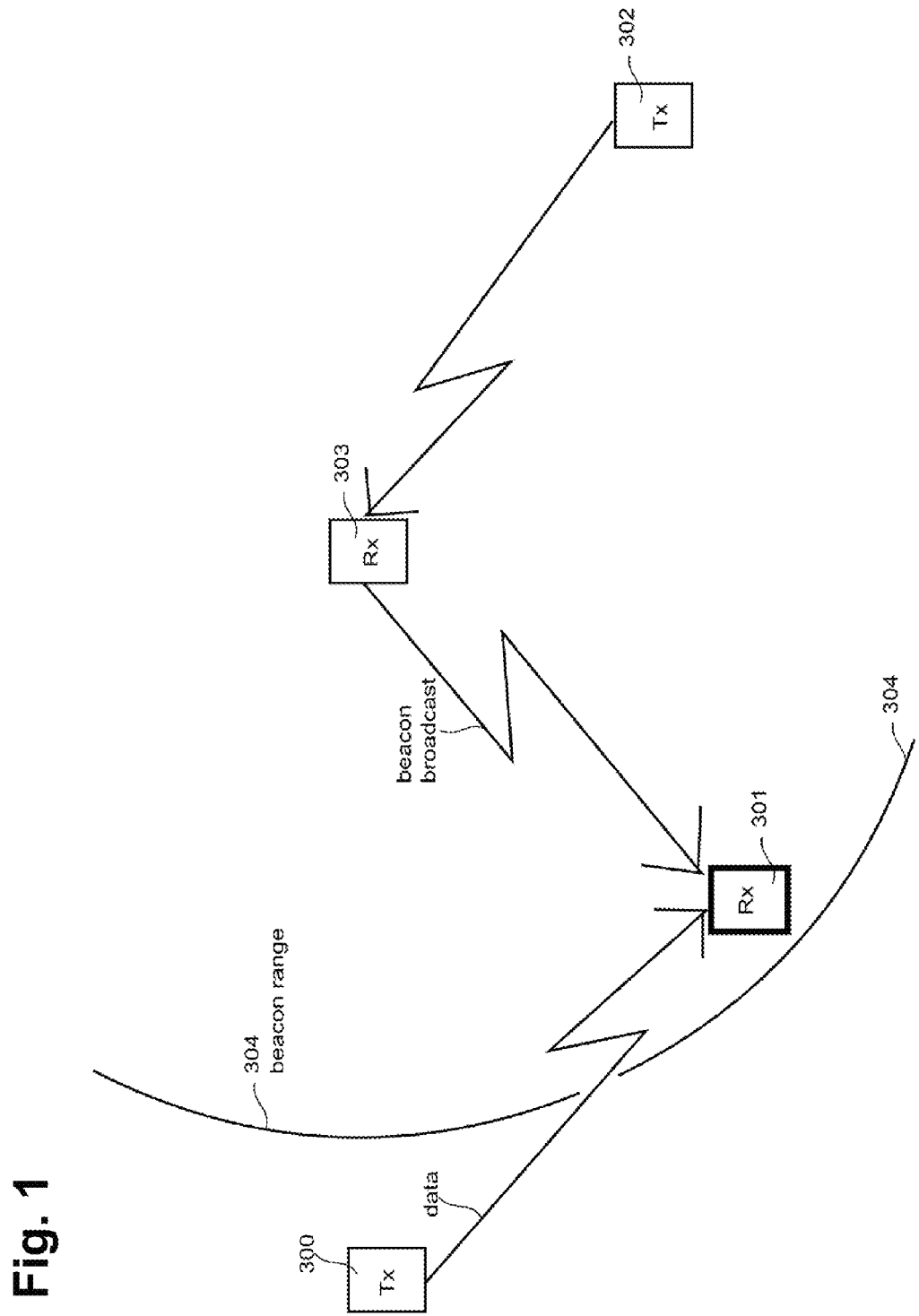
FIG. 1 illustrates an example of radio nodes sharing a common radio resource.

FIG. 1 illustrates an example of wireless apparatuses or devices or nodes sharing a common wireless resource. Access point Tx 300 transmits a data stream received by mobile wireless apparatus Rx 301, and access point Tx 302 transmits another stream received by mobile wireless apparatus Rx 303. All nodes operate in a wireless band where access to shared wireless resources may be coordinated using flexible spectrum use techniques.

While node 303 is receiving, it regularly broadcasts a special signal like for example a beacon symbol to alert nearby wireless apparatus of its presence. Thereby it "claims" the wireless medium resource for its continued reception, and prevents other nodes within beacon range 304 from transmitting on the same resource.

Node 301 is located within beacon range 304, and receives the beacon from 303. It "respects" node 303's claim on the radio resource and therefore does not use it for data transmission. However, it is still able to receive on the same resource, as long as the transmitting node 300 is outside of beacon range 304. It may also transmit beacons on its own. The "mirror image" of this example would be a beacon from 301 that would prevent 303 from transmitting and interfering with 301's reception. However, in this example, only node 303's beacons are of interest.

The above arrangement may optimize radio channel usage, because node pairs 300/301 and 302/303 are able to share the radio channel without causing interference. However, beacon transmissions from 303 do interfere with data reception at 301 (and, in a similar manner, beacons emitted by 301 would interfere with reception at 303).

Node 301 may implement an embodiment that cancels in its received signal unwanted interference portions caused for example by node 303's regular signal broadcasts like for example a beacon. For node 301 this may improve signal-to-noise ratio, data throughput and user experience.

Figure 2:
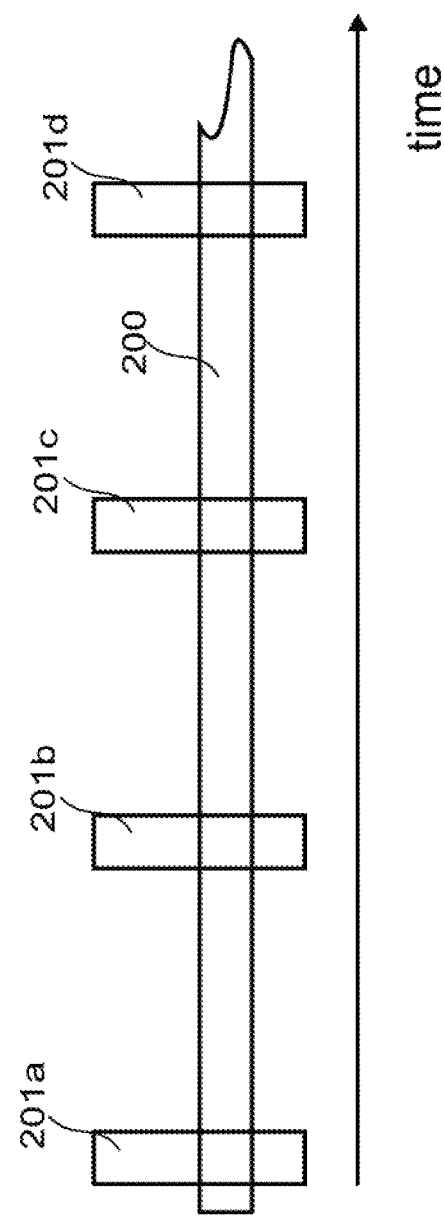
FIG. 2 illustrates an example of a received signal on a time axis.

FIG. 2 illustrates an example of signal component on a time axis. FIG. 2 illustrates the received signal component at node 301 (not to scale, height of boxes indicating spectral power density at the receive antenna of 301). The signal may contain both an information signal with the desired data transmission 200 (originating from node 300 in FIG. 1) and a beacon component with the beacon symbols 201a-d, emitted by node 303. In another exemplary scenario at node 301 only the beacon symbols are received and at a later point the desired data transmission may be received too. This may occur for example if the node 300 is not active in transmission all the time. Beside that there may be scenarios where first only the desired data transmission may be received and in a later stage the beacon symbol may be received too.

The beacon symbols are used for coordinating access to radio resources. However, they appear on top of the wanted signal 200 and deteriorate its signal-to-noise ratio.

Figure 3:
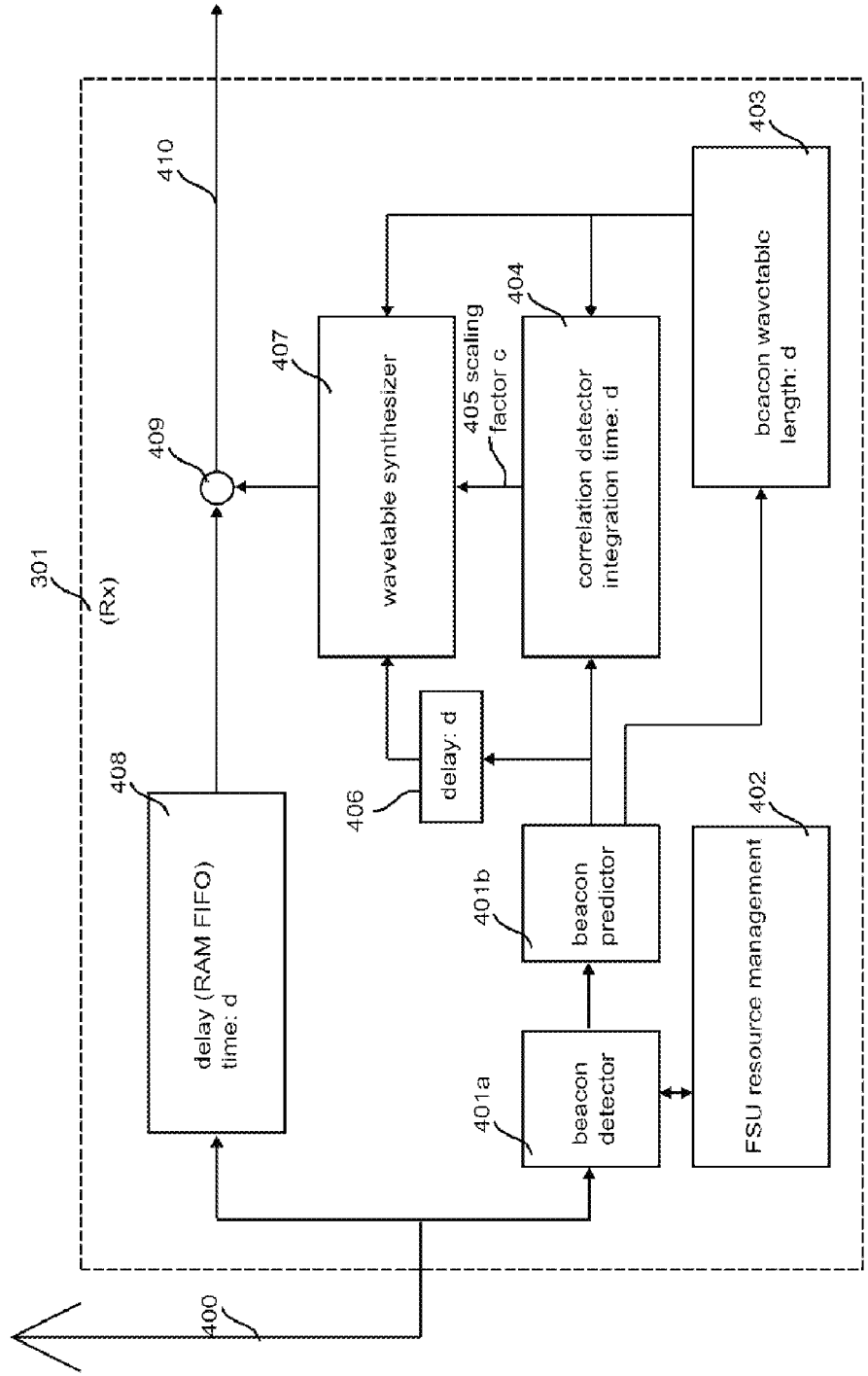
FIG. 3 illustrates an exemplary embodiment in a wireless device.

FIG. 3 illustrates an example of implementation of an embodiment that may be part of a wireless apparatus 301. Antenna 400 picks up the signal from the radio channel, including beacons and data transmission. Beacon detector 401a senses the presence of beacons. Depending on whether or not beacons are sensed, it configures Flexible Spectrum Use (FSU) ("fair and efficient sharing of radio resources") resource management block 402 to allow or forbid own transmissions on the wireless medium resource.

In an exemplary embodiment the steps in detecting beacon symbols with the beacon detector 401a use the Neyman-Pearson Lemma test (see for example: "Minimax Tests and the Neyman-Pearson Lemma for Capacities", P J Huber, V Strassen, *The Annals of Statistics*, 1973). The steps include:
  computing test statistic, and
  comparing the test statistic against a threshold.

The "test statistic" may be a numerical summary of the received data. It may be a matched filter, with the filter response matched to the known beacon waveform. Alternately, it may be a correlator, correlating with the known beacon waveform.

Figure 9:
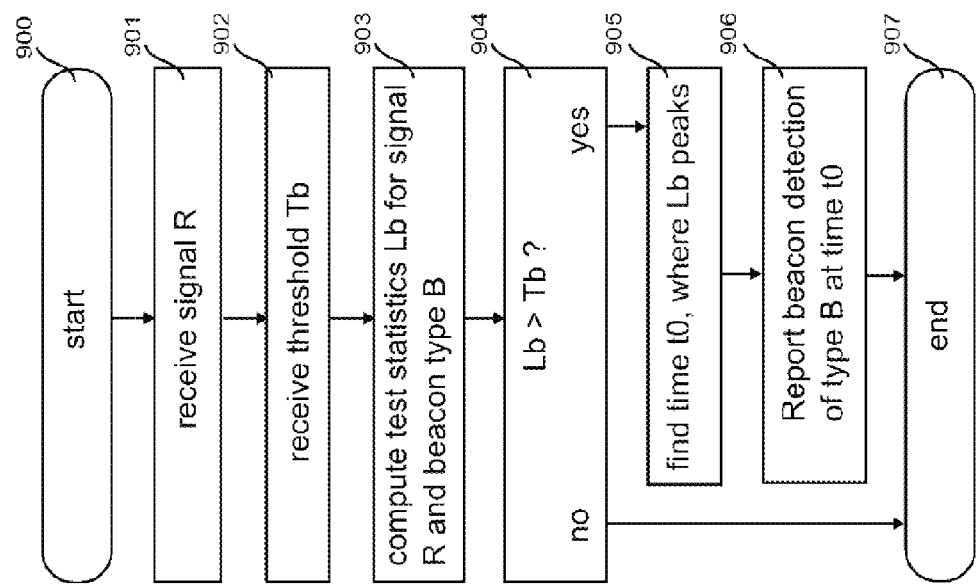

Another example embodiment of the beacon detector 401a may be based on the "Correlation demodulator" described in section 5.1.1, and "Matched-Filter Demodulator" described in section 5.1.2 of Digital Communications, 4th edition, John G. Proakis, McGraw-Hill 2001. The beacon detector 401a detects the actual beacon transmission in amplitude and phase. Its output may be a complex scaling factor that may be a least-squares fit between the beacon waveform and the received signal. FIG. 9 illustrates an example flowchart of an embodiment for beacon detection in beacon detector 401a.

Further, beacon predictor 401b of FIG. 3 has been monitoring the periodicity of the interfering beacons, accumulating knowledge of the beaconing pattern and may therefore predict the time instant, when a future interfering beacon of a known stream may be expected to arrive. The beacon detector 401a and beacon predictor 401b may be embodied as program logic stored in the RAM 62 and/or ROM 64 of FIG. 7 in the form of sequences of programmed instructions which, when executed in the CPU 60, carry out the functions of the disclosed embodiments.

Example steps in predicting future beacon symbols with the beacon predictor 401b are:
  detecting a beacon symbol of type B at time $t_0$, and
  based on the detection result, predicting a beacon symbol of type B at time $t_0+t_B$, where $t_B$ may be a predetermined beacon interval for beacons of type B.

Alternative example steps, where $P_B$ may be a beacon transmission pattern for beacons of type B, are:
  detecting n past beacon symbols of type B
  determining a match between n past detected beacon symbols and pattern $P_B$
  predicting a beacon symbol of type B at the next future position in pattern $P_B$.

Figure 8A:
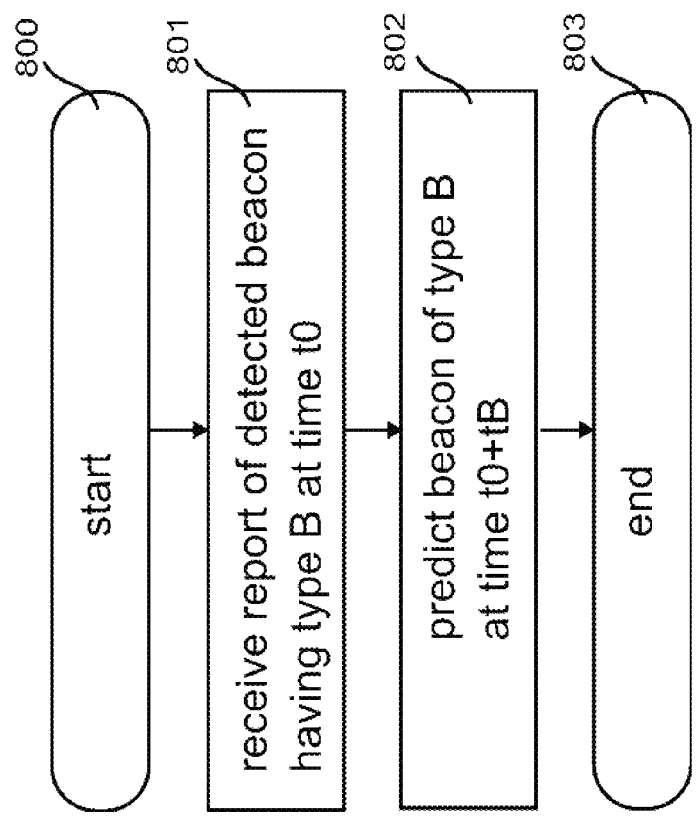
FIG. 8a illustrates an example flowchart of a first embodiment for beacon prediction in beacon predictor 401b.
Figure 8B:
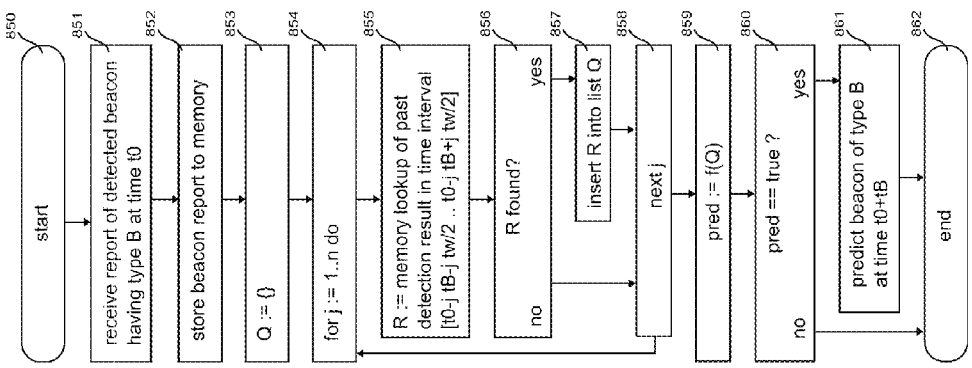
FIG. 8b illustrates an example flowchart of a second embodiment for beacon prediction in beacon predictor 401b.
Figure 8C:
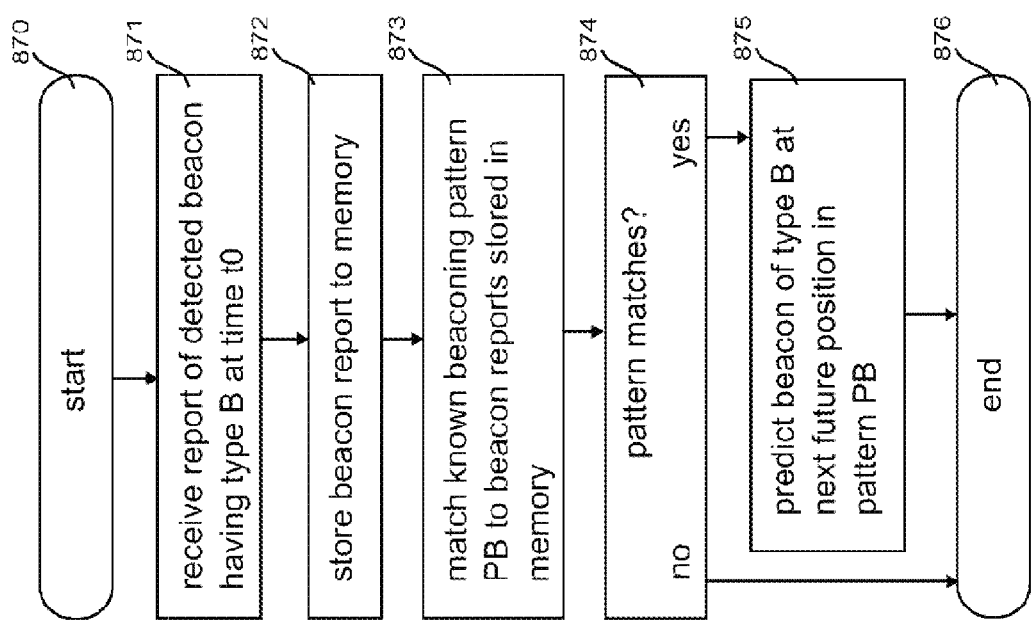
FIG. 8c illustrates an example flowchart of a third embodiment for beacon prediction in beacon predictor 401b, which is a general approach.

FIGS. 8a, 8b, and 8c illustrate example flowcharts of embodiments for beacon prediction in beacon predictor 401b.

The beacon predictor 401b may detect the type of a beacon symbol from a set of known beacon symbols. In addition, the beacon predictor 401b may detect the future time instant when the next beacon symbol may be expected, by monitoring the regularity of the interfering beacons, accumulating knowledge of the beaconing pattern thus able to extrapolate the pattern to predict the time when a future interfering beacon of a known stream may be expected to arrive.

A beacon stream may transmit repetitions of only a single type of beacon symbol. Alternatively, there may be several distinct beacon symbols to encode a small amount of information in the broadcasted beacon symbol, for example symbol 1 claiming the "right to transmit" at a later time, and symbol 2 claiming "undisturbed reception".

For a recognized beacon symbol, beacon predictor 401b configures beacon wavetable 403 of FIG. 3 to select the waveform identified in the beacon symbol. The beacon wavetable 403 may be a table of complex in-phase/quadrature (IQ) samples. The beacon wavetable 403 may be embodied as program logic stored in the RAM 62 and/or ROM 64 of FIG. 7 in the form of sequences of programmed instructions which, when executed in the CPU 60, carry out the functions of the disclosed embodiments. Each possible beacon symbol waveform may have its own table. Each beacon wavetable may contain complex conjugate samples of a known beacon waveform. The procedure chooses the table that corresponds to the predicted beacon.

Once beacon predictor 401b predicts the start of a new beacon symbol, it triggers correlation detector 404 of FIG. 3. Within correlation detector 404, samples of the received signal containing a beacon symbol may be multiplied with their counterpart from the beacon sequence in the beacon wavetable 403. The product may be accumulated over the length of the beacon. As a result, correlation detector 404 may output a complex scaling factor c (at 405) that describes a least-mean squares fit of the beacon sequence in the wavetable 403 to the received signal in amplitude and phase, minimizing , $\Sigma_j |r_j + cb_j|^2$, where r may be the received signal, b the beacon waveform, and j a sample index.

Correlation detector 404 in FIG. 3 may implement the operation $$c = \frac{\sum_{k=1}^{n_b} s_{k+m} b_k^*}{\sum_{k=1}^{n_b} b_k b_k^*} \quad \text{(eq 1)}$$

where
b is the waveform of the known beacon symbol B,
the asterisk denotes complex conjugation,
$n_b$ is the number of samples in the known beacon symbol B,
$b_k$ is the $k^{th}$ sample of the known beacon symbol B,
$s_x$ is the $x^{th}$ complex sample of the received signal, and
m is the sample index, where beacon symbol B was predicted in the received signal.

For a known beacon symbol waveform b, the denominator in eq 1 may be a real-valued scaling factor that may be precomputed.

The numerator in eq 1 may be calculated by computing the product between pairs of received signal samples and conjugate beacon samples and adding them in a complex-valued accumulator.

Figure 7:
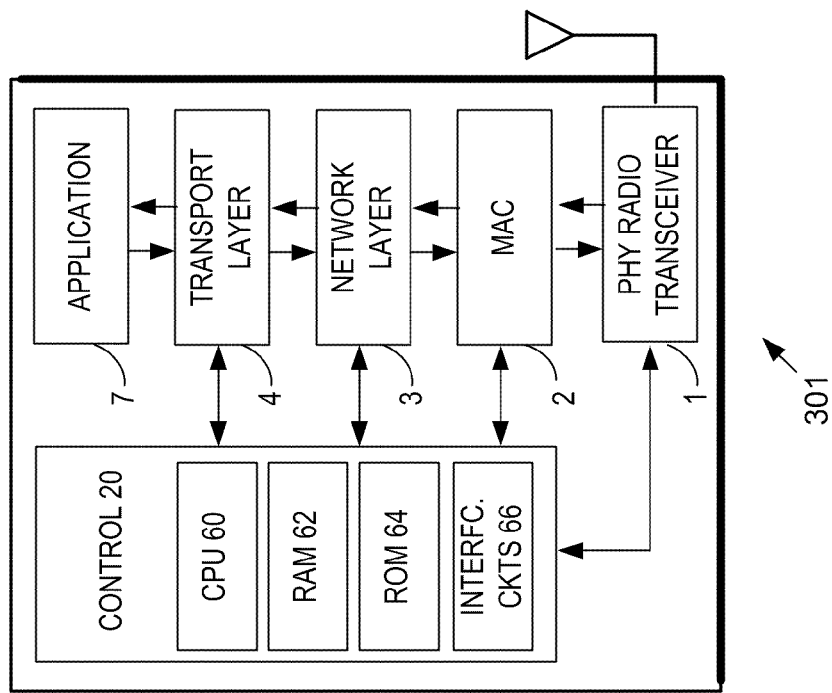
FIG. 7 is a functional block diagram of an example embodiment of the wireless device.

The correlation detector 404 may be embodied as program logic stored in the RAM 62 and/or ROM 64 of FIG. 7 in the form of sequences of programmed instructions which, when executed in the CPU 60, carry out the functions of the disclosed embodiments.

Delay 406 of FIG. 3, which may be a counter, triggers wavetable synthesizer 407, once detector 404 has processed a predetermined length of received signal, and complex scaling factor c (at 405) may be valid. The output signal of synthesizer 407 of FIG. 3 may be a least-squares fit of the wavetable beacon sequence to the received signal. The received signal may be delayed by an identical amount in first-in first-out (FIFO) 408. The synthesized beacon may then be subtracted in adder 409 of FIG. 3 from the delayed received signal. The wavetable synthesizer 407 may be embodied as program logic stored in the RAM 62 and/or ROM 64 of FIG. 7 in the form of sequences of programmed instructions which, when executed in the CPU 60, carry out the functions of the disclosed embodiments.

The role of the delay 406 may be to delay the received signal during the calculation of the complex scaling factor c by the correlation detector 404. Typically, a transmitter will shut down its synthesizer between beacon transmissions and therefore the phase may be completely random. Even if it would stay on, channel fading and frequency offsets will randomize the phase over the long span between two beacon symbols. The correlation detector 404 may be therefore used to detect at least the phase relationship between the known beacon sequence in the wavetable to the beacon symbol in the received signal, which may take some time. The received signal may be delayed in 408 by the same amount. Once the phase is detected (and at the same time an amplitude may be detected), then the beacon may be canceled as a whole. If the received signal does not contain the predicted beacon symbol at the predicted time, then the scaling factor may get very small, and effectively no beacon cancellation may take place. Depending on the strength of the received beacon symbol relative to other received signals, correlation detector 404 may calculate the complex scaling factor c with sufficient accuracy, given only a fraction of the received beacon symbol. In a further exemplary embodiment, the delay duration d may be chosen as one quarter of the length of a known beacon waveform. Correlation detector 404 may determine complex scaling factor c based on the first quarter of a predicted beacon symbol in the received signal. Beacon cancellation may then be performed using said scaling factor over the full length of the known beacon waveform.

In another exemplary embodiment the delay duration d may be shorter than the processing time of correlation detector 404. Correlation detector 404 may output c=0 until it has processed a length of signal according to delay duration d.

Conventional receiver processing may continue in FIG. 3 with signal 410, where the signal-to-noise ratio (SNR) may be improved over the original signal from antenna 400.

Figure 4:
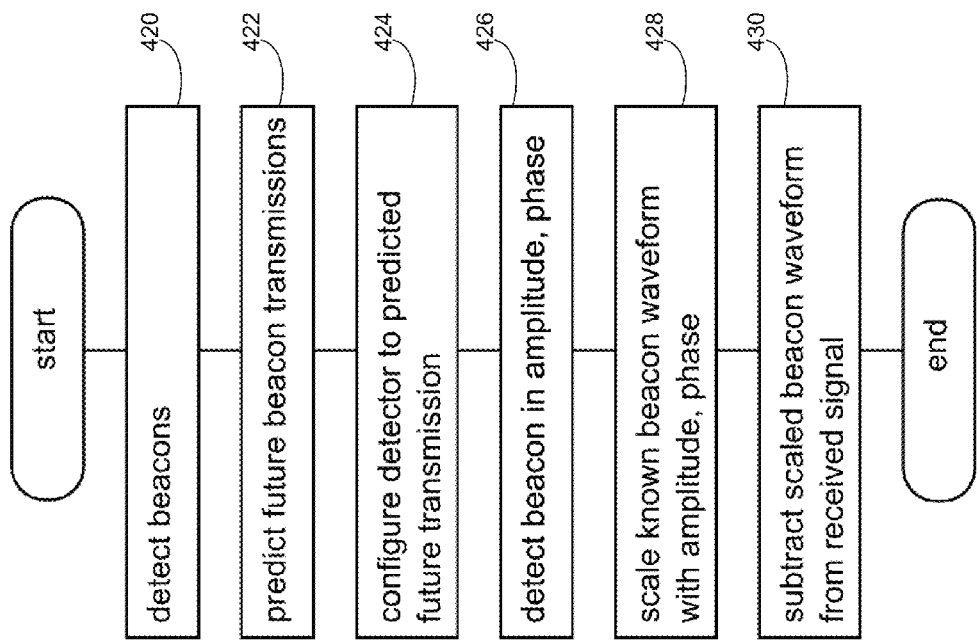
FIG. 4 illustrates an example flowchart of an embodiment, depicting steps carried out by the wireless device.

FIG. 4 illustrates an example flowchart of an embodiment, depicting steps in the procedure carried out by the wireless apparatus 301 in reducing interference of beacon transmissions from other wireless apparatuses. The steps in the procedure of the flow diagram of FIG. 4 may be embodied as program logic stored in the RAM 62 and/or ROM 64 of FIG. 7 in the form of sequences of programmed instructions which, when executed in the CPU 60, carry out the functions of an exemplary disclosed embodiment.

Step 420 follows the start, by detecting beacon symbols with the beacon detector 401a.

Step 422 predicts transmissions of future beacon symbols with beacon predictor 401b, which has been monitoring the regularity of the interfering beacons, accumulating knowledge of the beaconing pattern thus able to extrapolate the pattern to predict the time when a future interfering beacon of a known stream may be expected to arrive.

Step 424 configures the detector to the predicted future transmission with the beacon predictor 401b, which configures the beacon wavetable 403 to select the waveform identified in the beacon stream.

Step 426 detects a beacon symbol phase and possibly an amplitude with the correlation detector 404, in which samples of the received signal containing a beacon symbol are multiplied with their counterpart from the beacon sequence in the beacon wavetable 403. The product may be accumulated over the length of the beacon symbol.

Step 428 scales the known beacon waveform in wavetable synthesizer 407 with a complex scaling factor c, which may be output by correlation detector 404 and describes a least-mean squares fit of the known beacon sequence in the wavetable 403 to the received signal. The output signal of synthesizer 407 may be a least-squares fit of the wavetable beacon sequence to the received signal.

Step 430 subtracts the scaled beacon waveform from the received signal with the synthesized beacon being subtracted by the adder 409 from the received signal. As a result, interference of beacon transmissions between wireless devices may be reduced.

In one further embodiment, beacon detector 401a may be able to distinguish several beacon symbols originating from different sources.

Now beacon predictor 401b selects "one future predicted beacon symbol from a set of known beacon streams", configures wavetable 403 and triggers it accordingly. This enables to use one set of blocks 403, 404, 407 to cancel beacons from several sources, thereby utilizing those components more efficiently.

In yet another exemplary embodiment, the delay $d=d_1$ in blocks 404, 406 and 408 may be set shorter than the beacon length $d_2$. For example, a receiver may choose to use beacon cancellation only for beacons that are very strong, compared to other signals, allowing to obtain a reliable least-squares fit between received beacon and known beacon waveform without processing the full beacon length $d_2$. Consequently, the delay d that may be imposed on the received signal may be reduced.

Figure 5:
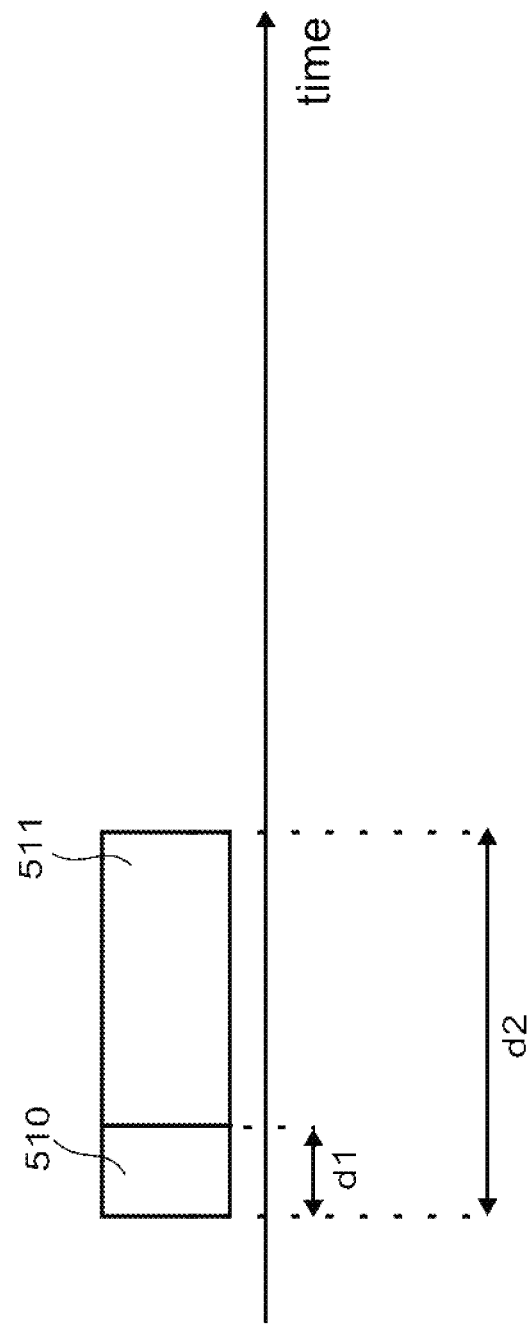
FIG. 5 illustrates an example beacon symbol, indicating an example where a correlation detector operates only on a first part of the beacon.

FIG. 5 illustrates a beacon, indicating a length $d_1$ that has been chosen as one quarter of the beacon length $d_2$. Now correlation detector 404 in FIG. 3 operates only on the first quarter 510 of the beacon. Accordingly, the delay in blocks 406 and 408 may be set to $d=d_1=d_2/4$, reducing the delay caused to the received signal between antenna 400 and output 410. Beacon cancellation still takes place over the full length of the beacon, including segment 511 in FIG. 5.

The resulting invention has the technical effects of:
removing constraints on beacon signaling
enabling FSU beaconing with reduced interference in the absence of synchronization, i.e. common beacon intervals etc. improving signal-to-noise ratio (leading to improvements in throughput, radio link reliability, spectral efficiency, battery operation time) with a comparatively small amount of signal processing as detector 401a may be assumed in any case for a FSU system. Both 404 and 407 may require only one complex-valued multiplication per input sample each.

Figure 6:
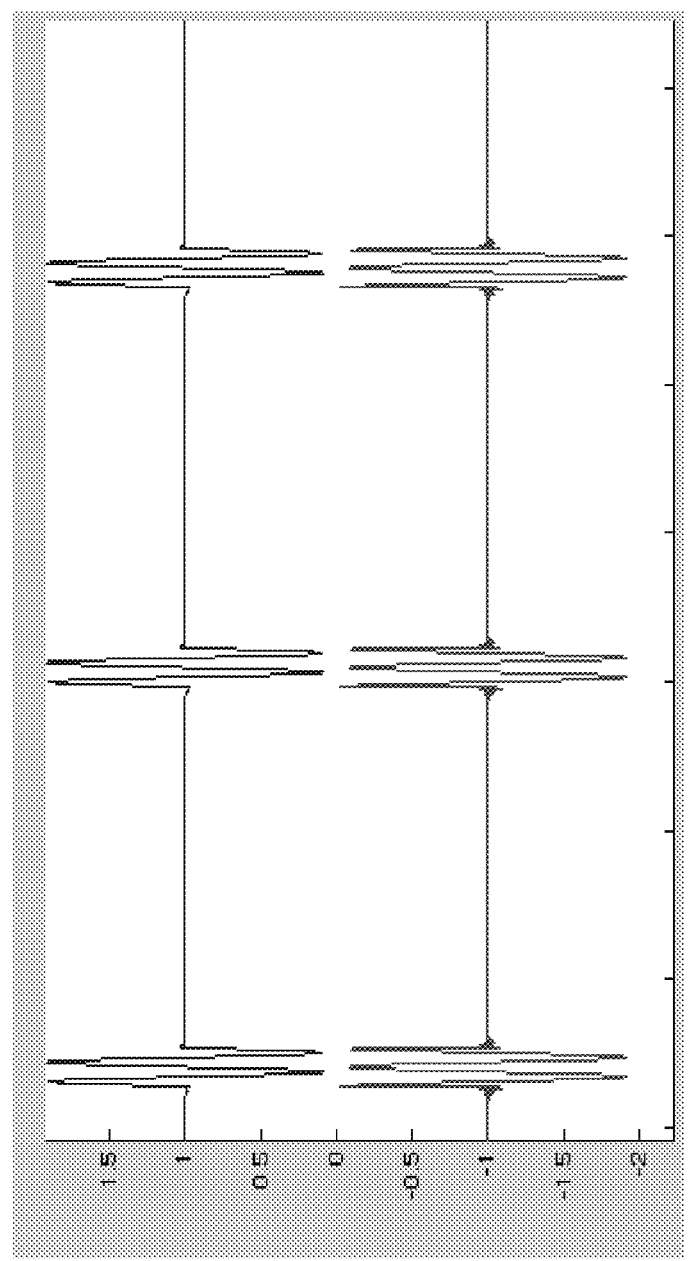
FIG. 6 is an example IQ baseband waveform of a periodic beacon symbol from a remote device creating interference.

FIG. 6 is an example IQ baseband waveform of a periodic beacon symbol from a remote apparatus creating interference. The figure shows the baseband waveform (real part/imaginary part) of three consecutive beacon symbols. The beacon predictor 401b monitors the periodicity of the interfering beacons, accumulating knowledge of the beaconing pattern and may be thus able to extrapolate the pattern to predict the time when a future interfering beacon of a known stream may be expected to arrive.

FIG. 7 is a functional block diagram of an example embodiment of the wireless apparatus 301. The wireless apparatus 301 may be for example a mobile communications device, PDA, cell phone, laptop, mobile terminal or palmtop computer, or the like. The wireless apparatus 301 may also be an information source or sink, which may be usually static and may be connected to a wireless or wired backbone network. The wireless apparatus 301 includes a control module 20, which includes a central processing unit (CPU) 60, a random access memory (RAM) 62, a read only memory (ROM) 64, and interface circuits 66 to interface with the physical (PHY) radio transceiver 1, battery and other energy sources, key pad, touch pad, touch screen, display, microphone, speakers, ear pieces, camera or other imaging devices, etc. The RAM 62 and ROM 64 may be removable memory devices such as smart cards, SIMs, WIMs, semiconductor memories such as RAM, ROM, PROMS, flash memory devices, etc. The Transport Layer 4, Network Layer 3, and medium access control (MAC) sub-layer in Layer 2, and/or application program 7 may be embodied as program logic stored in the RAM 62 and/or ROM 64 in the form of sequences of programmed instructions which, when executed in the CPU 60, carry out the functions of the disclosed embodiments. The steps in the procedure of the flow diagram of FIG. 4 may be embodied as program logic stored in the RAM 62 and/or ROM 64 of FIG. 7 in the form of sequences of programmed instructions which, when executed in the CPU 60, carry out the functions of the disclosed embodiments. The program logic may be delivered to the writeable RAM, PROMS, flash memory devices, etc. 62 of the wireless apparatus 301 from a computer program product or article of manufacture in the form of computer-usable media such as resident memory devices, smart cards or other removable memory devices. Alternately, the Transport Layer 4, Network Layer 3, and MAC sub-layer in Layer 2, and/or application program 7 may be embodied as integrated circuit logic in the form of programmed logic arrays or custom designed application specific integrated circuits (ASIC).

In example embodiments of the invention, the transceiver 1 of the wireless device 301 of FIG. 7 is configured to receive a composite signal, wherein the composite signal includes at least a beacon component comprising a regular beacon symbol. The beacon predictor 401b of the wireless device 301 of FIG. 3 is configured to determine from the beacon component, a predicted reception of a predicted future beacon symbol, using a known beacon transmission pattern. The correlation detector 404 of the wireless device 301 of FIG. 3 is configured to determine a scaling factor, based at least partly on the composite signal and a known beacon waveform. The logic circuit 409 of the wireless device 301 of FIG. 3 is configured to subtract or cancel the known beacon waveform that may be multiplied by the scaling factor, from the composite signal. The composite signal may comprise an information signal. The logic circuit 409 is further configured to subtract or cancel only when a magnitude of the complex scaling factor exceeds a threshold. The logic circuit 409 is further configured to obtain the magnitude from an earlier detected beacon. The correlation detector 404 is further configured to determine the complex scaling factor based at least partly on calculating at least one sum of products between samples of the composite signal and samples of the known beacon waveform. The number of samples, over which the sum is calculated, may be less than the number of samples subtracted from the composite signal.

FIG. 8a illustrates an example flowchart of a first exemplary embodiment for beacon prediction in beacon predictor 401b. The process starts in step 800.

In step 801, a report of detecting a beacon symbol of type B at time $t_0$ is received.

In step 802, a future beacon transmission is predicted at $t_0+t_B$, where $t_B$ is a known beacon period length for beacon symbols of type B.

The process ends at step 803.

FIG. 8b illustrates an example flowchart of a second exemplary embodiment for beacon prediction in beacon predictor 401b. The process starts in step 850.

In step 851, a report of detecting a beacon symbol of type B at time $t_0$ is received.

In step 852, the report is stored in a memory.

in step 853, an empty list Q is created.

In step 854, a variable j is looped through values from 1 to n. n is a predetermined parameter. n may be 5.

In step 855, a past beacon transmission is looked up in a time window. The time window is centered around the $j^{th}$ past beacon interval according to a known beacon period length $t_B$ for beacons of type B.

Further, the time window may increase in length by a predetermined window increment $t_w$. $t_w$ may be a predetermined parameter. $t_w$ may be 1% of the beacon symbol duration. Alternatively, $t_w$ may be 0, resulting in a fixed time window.

If a past beacon symbol detection within the time interval was found from memory in step 856, step 857 inserts the past beacon symbol detection into the list Q.

Step 858 closes the loop of step 854 and iterates over all values of j.

In step 859, a prediction result may be computed using an arbitrary function f, based on the contents of list Q. For example, f may report "true" if the number of elements in list Q exceeds a threshold.

If it is found in step 860 that function f predicts a future beacon symbol transmission.

A beacon symbol prediction of type B at time $t_0+t_B$ may be reported in step 861.

The process ends in step 862.

FIG. 8c illustrates an example flowchart of a third exemplary embodiment for beacon symbol prediction in beacon predictor 401b, which may be a general approach. The process starts in step 870.

In step 871, a report of detecting a beacon symbol of type B at time $t_0$ is received.

In step 872, the report may be stored in a memory.

In step 873, a known pattern $P_B$ for beacon transmissions of type B may be matched against detection results for beacon symbols of type B that were stored in the memory.

If a match between pattern $P_B$ and stored detection results was detected in step 874, a future beacon symbol transmission of type B may be predicted in step 875 as the next beacon symbol transmission instant scheduled by the pattern $P_B$.

The process ends in step 876.

FIG. 9 illustrates an example flowchart of an exemplary embodiment for beacon symbol detection in beacon detector 401a. The process starts in step 900.

In step 901, a received signal R is acquired. R may be provided by antenna 400 and may contain beacon transmissions from other radios.

In step 902, a detection threshold $T_b$ for a beacon symbol type B is acquired. The threshold $T_b$ may be provided by FSU resource management unit 402.

In step 903, a test statistic $L_b$ for received signal R and beacon symbol type B is computed.

$L_b$ may be the output of a matched filter configured to the waveform of beacon symbol type B processing the received signal R.

$L_b$ may be the output of a correlator taking the received signal R and the waveform of beacon symbol type B as its inputs.

In step 904, the test statistic $L_b$ is compared against the threshold $T_b$. If $L_b$ exceeds $T_b$, a beacon symbol of type B is detected.

In step 905, a peak search is performed on the test statistic, resulting in a time to where $L_b$ peaks.

In step 906, the result of detecting a beacon symbol of type B at time $t_0$ is reported.

The process ends in step 907.

Figure 10:
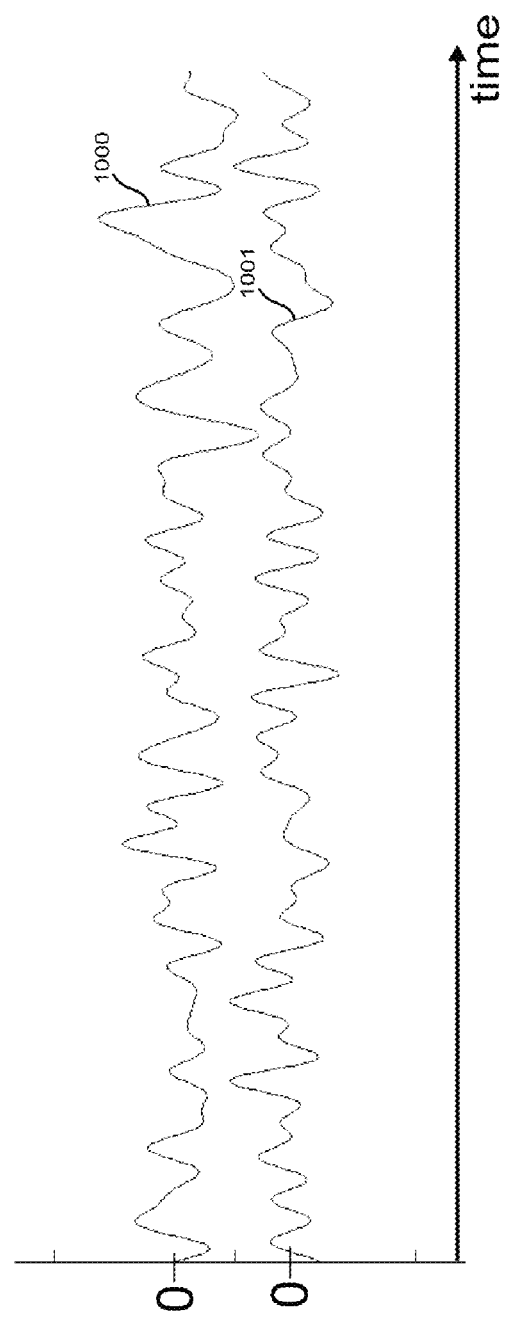
FIG. 10 shows an example baseband waveform of an OFDM signal, where trace 1000 is its real part and trace 1001 is its imaginary part.

FIGS. 10-15 illustrate the process of beacon detection. FIG. 10 shows the exemplary baseband waveform of an orthogonal frequency division multiplex (OFDM) signal, where trace 1000 may be its real part and trace 1001 may be its imaginary part. Each trace has been shifted to an individual origin on the vertical axis for clarity.

Figure 11:
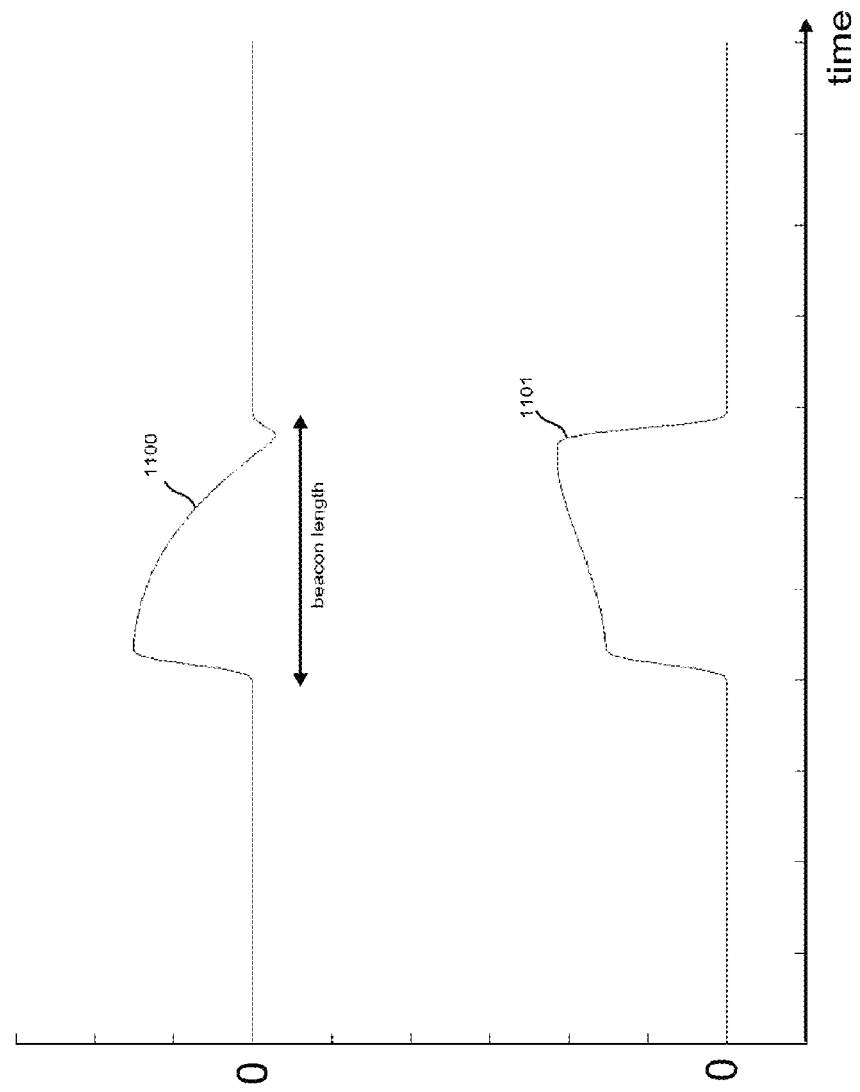
FIG. 11 shows an example baseband waveform of a beacon symbol, where trace 1100 is its real part and trace 1101 is its imaginary part.

FIG. 11 shows the baseband waveform of an exemplary beacon symbol, where trace 1100 may be its real part and trace 1101 may be its imaginary part.

Figure 12:
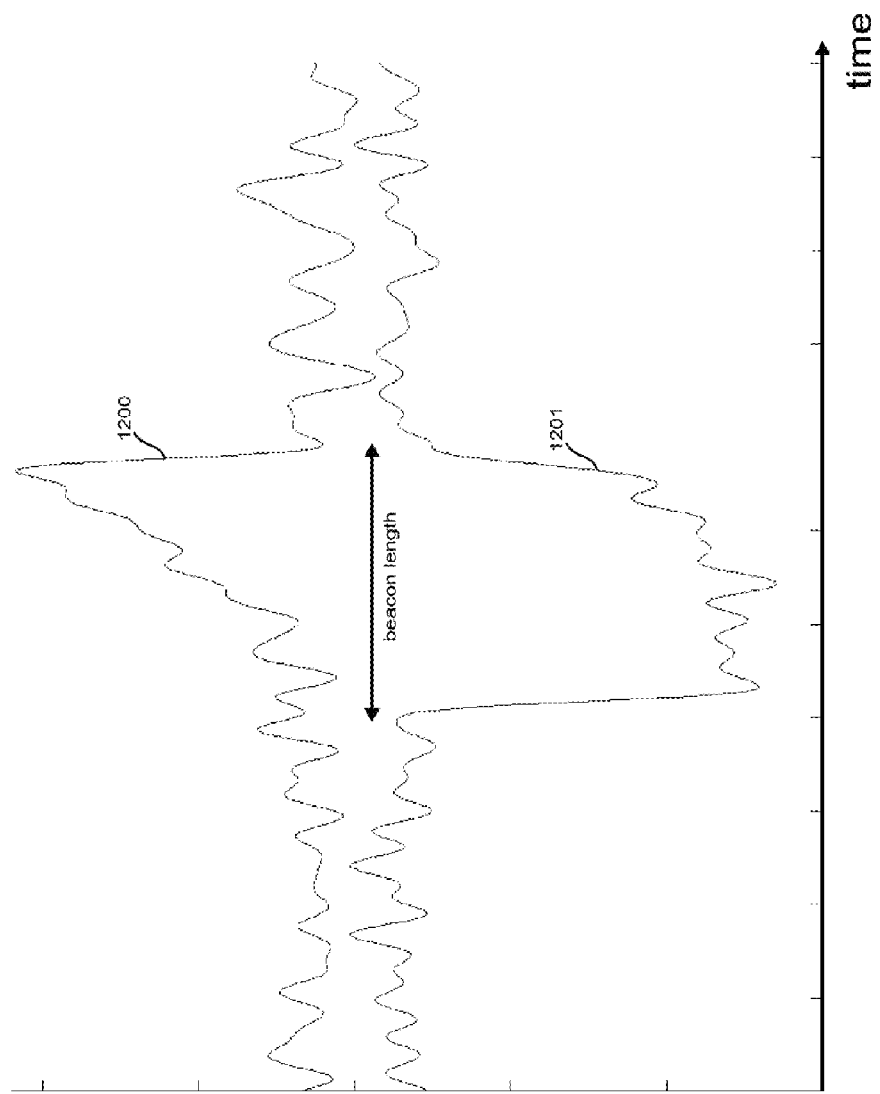
FIG. 12 shows an example real part 1200 and imaginary part 1201 of a received OFDM signal with an interfering beacon transmission.

FIG. 12 shows real part 1200 and imaginary part 1201 of a received OFDM signal with an interfering beacon symbol. The beacon symbol may be much stronger than the received signal and causes severe interference that may disrupt reception.

Figure 13:
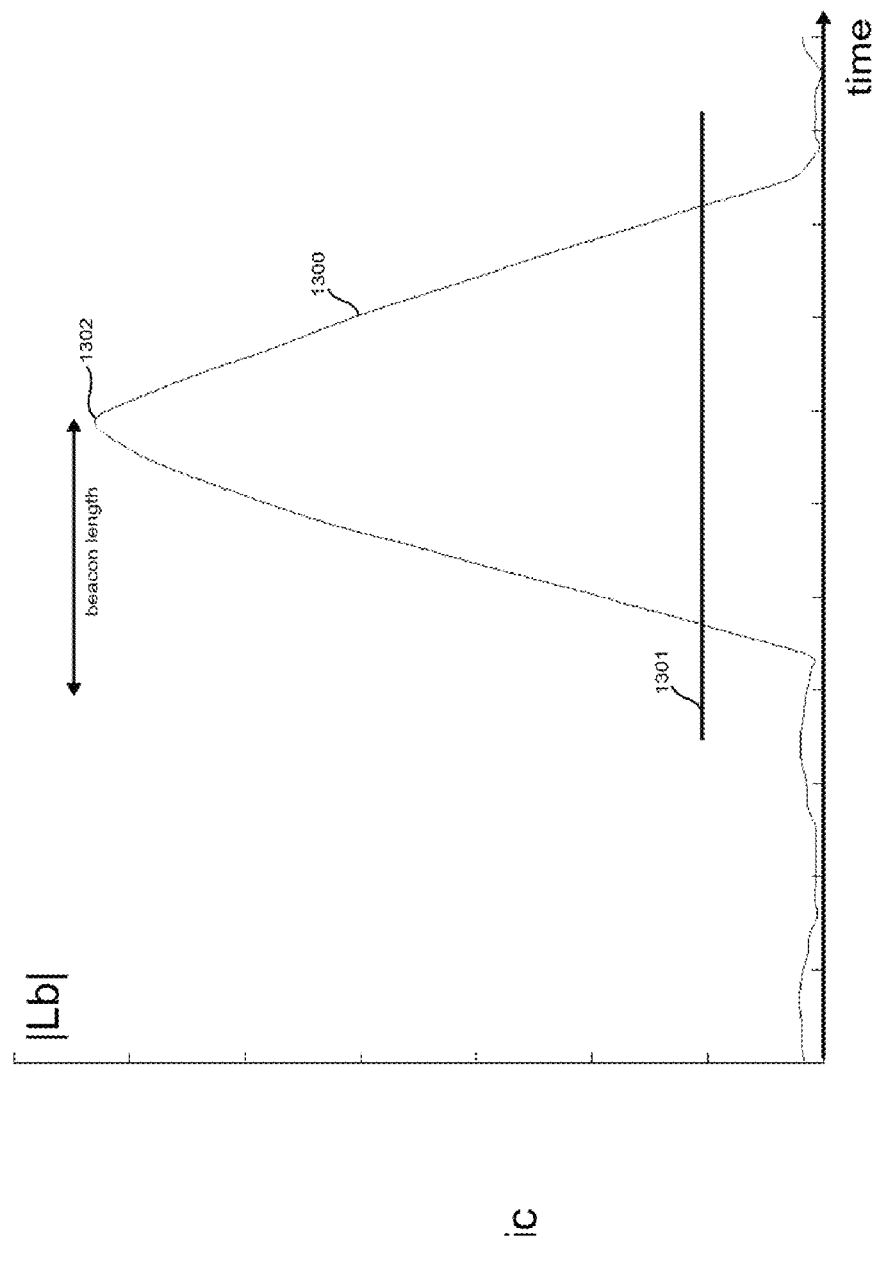
FIG. 13 shows an example output of a matched filter processing the received signal.

In beacon detection, the trace 1300 in FIG. 13 shows the exemplary output of a matched filter processing the received signal. The filter may be configured with an impulse response matching the time-reversed conjugate of the known beacon symbol waveform B. The output of the filter may be used as a test statistic $L_b$ for beacon symbol type B. Line 1301 indicates a threshold. When trace 1300 exceeds threshold 1301, a beacon symbol may be detected. A peak search may be performed, resulting in a detection of peak 1302 at time $t_0$.

Figure 14:
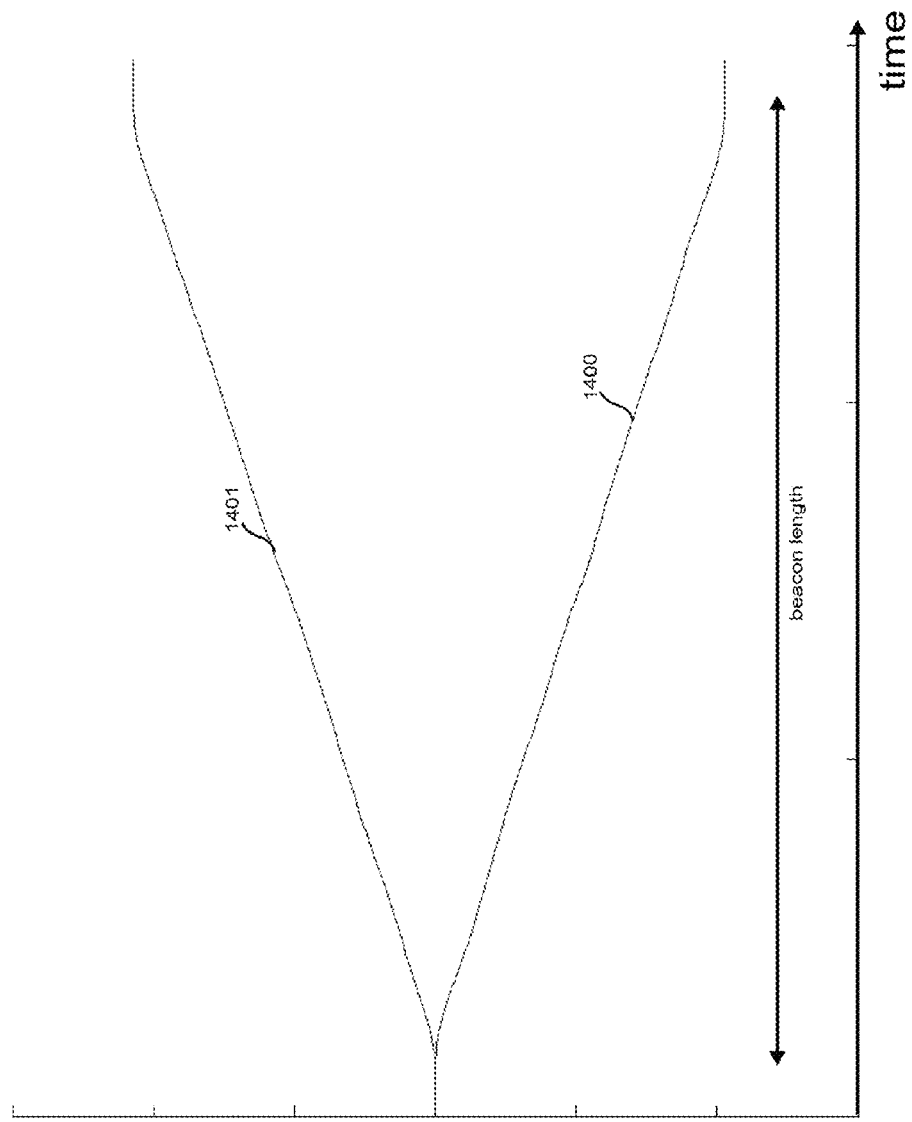
FIG. 14 shows an example of contents of a complex accumulator over the duration of one beacon symbol.

FIG. 14 shows exemplary the contents of a complex accumulator over the duration of one beacon symbol. It shows how the "sum of products between samples of the composite signal and samples of a known beacon waveform" evolves over time, leading to the scaling factor. Trace 1400 corresponds to the real part and trace 1401 to the imaginary part of the accumulator content. The beacon waveform may be normalized to $\Sigma_{k=1}^{n_b} b_k b_k^b = 1$. The accumulator may contain at the end of integration a complex scaling factor c that achieves a least-squares fit between the known beacon waveform and the received signal.

Figure 15:
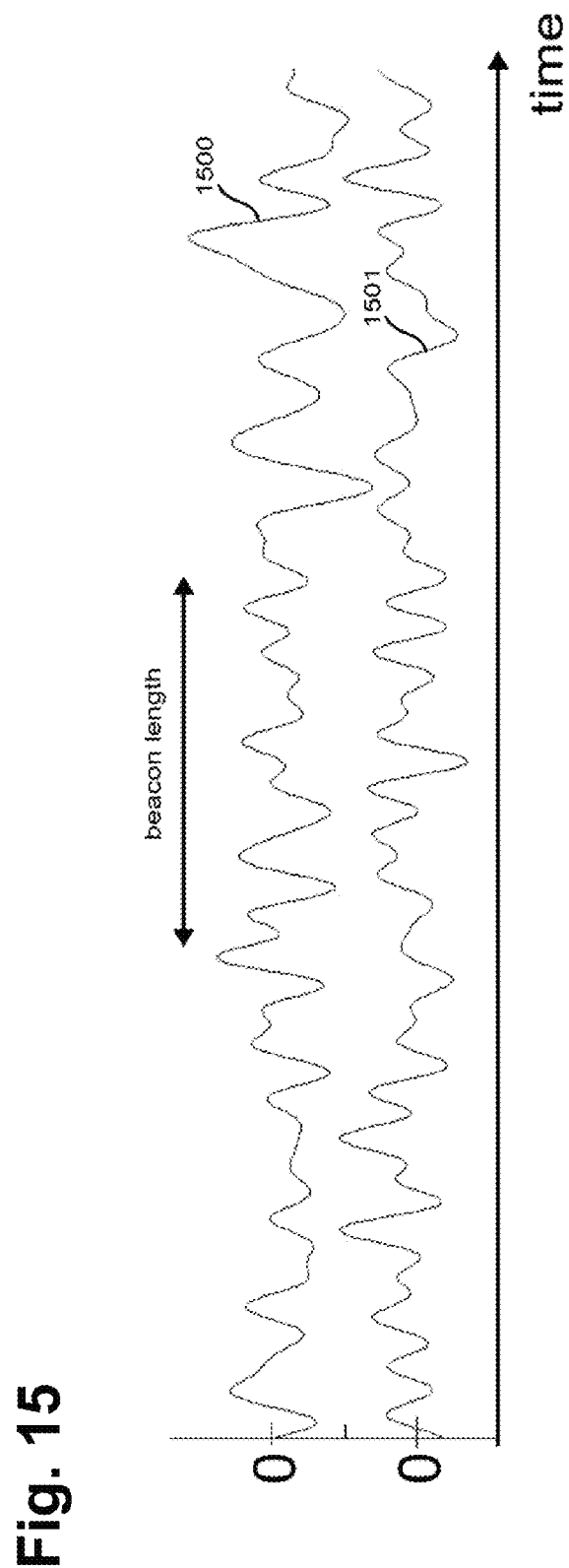
FIG. 15 shows an example of signal 410 from FIG. 3.

FIG. 15 shows signal 410 from FIG. 3. Trace 1500 may be its real part and trace 1501 its imaginary part. The known beacon waveform has been multiplied with scaling factor c and subtracted from a delayed version of the received signal. A comparison with FIG. 10 shows that the interfering beacon transmission has been removed from the OFDM signal.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes may be made to the specific example embodiments without departing from the spirit and scope of the invention.

What is claimed is:

1. A method, comprising:
  receiving, in a receiver, a composite signal, wherein the composite signal includes at least a beacon component comprising a sequence of interfering, regular beacon symbols;
  detecting, in the receiver, the sequence of interfering, regular beacon symbols in the received beacon component;
  determining, in the receiver, from the beacon component, a predicted reception time instant of a predicted future interfering beacon symbol, using accumulated knowledge of a beacon transmission pattern and past detected beacon symbols, by monitoring a periodicity of the sequence of interfering, regular beacons, accumulating knowledge of a beaconing pattern from the periodicity of the sequence of interfering, regular beacons, and predicting a time instant, when a future interfering beacon of the composite signal is predicted to arrive at the receiver; and
  canceling, in the receiver, from the composite signal that is received at the predicted reception time instant, a future received beacon symbol, based at least partly on the predicted future interfering beacon symbol.

2. The method of claim 1, wherein the composite signal comprises an information signal.

3. The method of claim 2, wherein the information signal is received from a wireless apparatus.

4. The method of claim 1, wherein the beacon component is received from another wireless apparatus.

5. The method of claim 1, wherein the predicted reception time instant of a future beacon symbol comprises predicting a type of the beacon symbol.

6. The method of claim 1, further comprising:
  determining a complex scaling factor, based at least partly on the composite signal and a known beacon waveform;
  subtracting the known beacon waveform, multiplied by the scaling factor, from the composite signal.

7. The method of claim 6, further comprising:
  said subtracting occurring only when a magnitude of the complex scaling factor exceeds a threshold.

8. The method of 7, further comprising:
  said threshold is obtained from a magnitude of an earlier detected beacon.

9. The method of claim 6, wherein the determining a complex scaling factor is based at least partly on calculating at least one sum of products between samples of the composite signal and samples of the known beacon waveform 10. The method of claim 9, wherein the number of samples, over which the sum is calculated, is less than the number of samples subtracted from the composite signal.

11. An apparatus, comprising:
  at least one processor; and
  at least one memory including computer program code, the at least one memory and the computer program code configured to, with the at least one processor, cause the apparatus at least to:
  receive a composite signal, wherein the composite signal includes at least a beacon component comprising a sequence of interfering, regular beacon symbols;
  detect the sequence of interfering, regular beacon symbols in the received beacon component;
  determine from the beacon component, a predicted reception time instant of a predicted future interfering beacon symbol, using accumulated knowledge of a beacon transmission pattern and past detected beacon symbols, by monitoring a periodicity of the sequence of interfering, regular beacons, accumulating knowledge of a beaconing pattern from the periodicity of the sequence of interfering, regular beacons, and predicting a time instant, when a future interfering beacon of the composite signal is predicted to arrive at the apparatus; and
  cancel from the composite signal that is received at the predicted reception time instant, a future received beacon symbol, based at least partly on the predicted future interfering beacon symbol.

12. The apparatus of claim 11, wherein the composite signal comprises an information signal.

13. The apparatus of claim 12, wherein the information signal is received from a wireless apparatus.

14. The apparatus of claim 11, wherein the beacon component is received from another wireless apparatus.

15. The apparatus of claim 11, wherein the predicted reception time instant of a future beacon symbol comprises predicting a type of the beacon symbol.

16. The apparatus of claim 11, further comprising:
  the at least one memory and the computer program code configured to, with the at least one processor, cause the apparatus at least to further perform:
    determining a complex scaling factor, based at least partly on the composite signal and a known beacon waveform;
    subtracting the known beacon waveform, multiplied by the scaling factor, from the composite signal.

17. A computer readable non-transitory medium, comprising:
  a computer readable non-transitory medium having computer program code therein;
  program code in the computer readable non-transitory medium, for receiving, in a receiver, a composite signal, wherein the composite signal includes at least a beacon component comprising a sequence of interfering, regular beacon symbols;
  program code in the computer readable non-transitory medium, for detecting, in the receiver, the sequence of interfering, regular beacon symbols in the received beacon component;
  program code in the computer readable non-transitory medium, for determining, in the receiver, from the beacon component, a predicted reception time instant of a predicted future interfering beacon symbol, using accumulated knowledge of a beacon transmission pattern and past detected beacon symbols, by monitoring a periodicity of the sequence of interfering, regular beacons, accumulating knowledge of a beaconing pattern from the periodicity of the sequence of interfering, regular beacons, and predicting a time instant, when a future interfering beacon of the composite signal is predicted to arrive at the receiver; and program code in the computer readable non-transitory medium, for canceling, in the receiver, from the composite signal that is received at the predicted reception time instant, a future received beacon symbol, based at least partly on the predicted future interfering beacon symbol.

18. An apparatus, comprising:

means for receiving, in a receiver, a composite signal, wherein the composite signal includes at least a beacon component comprising a sequence of interfering, regular beacon symbols;

means for detecting, in the receiver, the sequence of interfering, regular beacon symbols in the received beacon component;

means for determining, in the receiver, from the beacon component, a predicted reception time instant of a predicted future interfering beacon symbol, using accumulated knowledge of a beacon transmission pattern and past detected beacon symbols, by monitoring a periodicity of the sequence of interfering, regular beacons, accumulating knowledge of a beaconing pattern from the periodicity of the sequence of interfering, regular beacons, and predicting a time instant, when a future interfering beacon of the composite signal is predicted to arrive at the receiver; and means for canceling, in the receiver, from the composite signal that is received at the predicted reception time instant, a future received beacon symbol, based at least partly on the predicted future interfering beacon symbol.

19. An apparatus, comprising:

a transceiver configured to receive a composite signal, wherein the composite signal includes at least a beacon component comprising a sequence of interfering, regular beacon symbols;

a detector configured to detect the sequence of interfering, regular beacon symbols in the received beacon component;

a beacon predictor configured to determine from the beacon component, a predicted reception time instant of a predicted future interfering beacon symbol, using accumulated knowledge of a beacon transmission pattern and past detected beacon symbols, by monitoring a periodicity of the sequence of interfering, regular beacons, accumulating knowledge of a beaconing pattern from the periodicity of the sequence of interfering, regular beacons, and predicting a time instant, when a future interfering beacon of the composite signal is predicted to arrive at the receiver;

a correlation detector configured to determine a correlation, based at least partly on the composite signal that is received at the predicted reception time instant, the predicted reception time instant of a predicted future interfering beacon symbol, and a known beacon waveform; and a logic circuit configured to subtract the known beacon waveform, based on the correlation, from the composite signal.

20. The apparatus of claim 19, wherein the composite signal comprises an information signal.

21. The apparatus of claim 19, further comprising:

said logic circuit further configured to subtract only when a magnitude of the correlation exceeds a threshold.

* * * * *